US006444182B1

(12) United States Patent
Baranov et al.

(10) Patent No.: US 6,444,182 B1
(45) Date of Patent: Sep. 3, 2002

(54) NUCLEAR FUEL REPROCESSING USING HYDROPHILIC SUBSTITUTED HYDROXYLAMINES

(75) Inventors: Sergey Mikhailovich Baranov; Valentin Sergeevich Koltunov, both of Moscow (RU); Robin John Taylor; Iain May, both of Seascale (GB)

(73) Assignee: British Nuclear Fuels plc, Cheshire (GB)

( * ) Notice: Subject to any disclaimer, the term of this patent is extended or adjusted under 35 U.S.C. 154(b) by 0 days.

(21) Appl. No.: 09/613,660

(22) Filed: Jul. 11, 2000

(51) Int. Cl.[7] .......................... B01D 11/00; C22B 60/00
(52) U.S. Cl. ....................................................... 423/9
(58) Field of Search ............................... 423/9; 376/310, 376/311

(56) References Cited

U.S. PATENT DOCUMENTS

| 3,966,804 A | * | 6/1976 | Bathellier et al. | |
| 4,229,421 A | * | 10/1980 | Chapman et al. | 423/10 |
| 4,659,551 A | | 4/1987 | Kolarik et al. | 423/10 |
| 5,476,641 A | * | 12/1995 | Todokoro et al | 423/7 |
| 5,961,679 A | * | 10/1999 | Forsberg | 588/12 |
| 6,093,375 A | * | 7/2000 | Taylor et al. | 423/9 |

FOREIGN PATENT DOCUMENTS

| DE | 3332954 | | 3/1985 |
| EP | 0638907 | | 2/1995 |
| GB | 2004407 | | 3/1979 |
| JP | 05066290 | | 3/1993 |
| WO | WO96/11477 | | 4/1996 |
| WO | WO97/30456 | | 8/1997 |
| WO | 99/23667 | * | 5/1999 |
| WO | 99/23668 | * | 5/1999 |
| WO | WO00/13187 | | 3/2000 |
| WO | WO00/13188 | | 3/2000 |

OTHER PUBLICATIONS

Sze et al., *Oxidation of Pu(III) by Nitric Acid in Tri–n–Butyl Phosphate Solutions. Part II. Chemical Methods for the Suppression of Oxidation to Improve Plutonium Separation in Contactor Operation.* Nuclear Technology, vol. 63, Dec. 1983, pp. 431–441.

Miguel et al., *Extraction of Cu(II), Fe(III), Ga(III), Ni(II), In(III), Co(II), Zn (II), and Pb(II) with LIX® 984 dissolved in n–heptane.*, Hydrometallurgy 47 (1997) pp. 19–30, no month.

Koltunov et al., *Organic Manufactured Hydrazinies and Hydroxyamines in the Future Reprocessing Technology of Irradiated Nuclear Fuel,* © Radiokhimiya, N 6, (1993) pp. 1–9, no month.

Koltunov et al., *Organic Derivatives of Hydrazine and Hydroxylamine in Future Technology of Spent Nuclear Fuel Reprocessing.*, pp. 577–584.(1995), no month.

* cited by examiner

Primary Examiner—Steven Bos
(74) Attorney, Agent, or Firm—Myers Bigel Sibley & Sajovec

(57) ABSTRACT

The spent nuclear fuel reprocessing method includes contacting an organic phase containing Np(VI) with a hydrophilic substituted hydroxylamine in which at least one N—H hydrogen of the hydroxylamine is replaced by an organic substituent, there being at least one such organic substituent having one or more hydroxyl groups. Np(VI) is reduced to Np(V), which is then backwashed into an aqueous phase.

10 Claims, 1 Drawing Sheet

NUCLEAR FUEL REPROCESSING USING HYDROPHILIC SUBSTITUTED HYDROXYLAMINES

Figure 1:
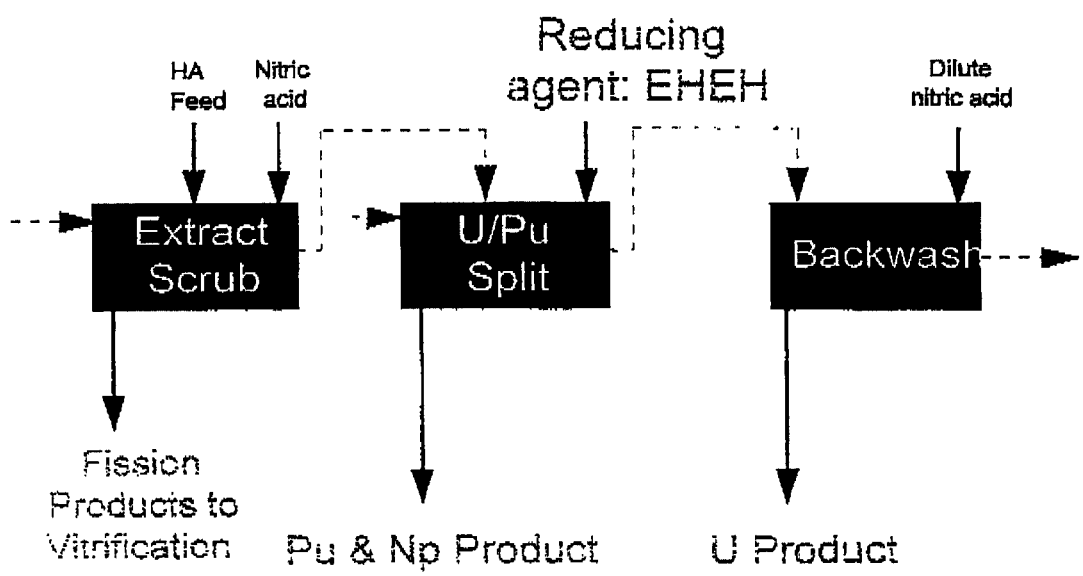

This invention relates to nuclear fuel reprocessing and is particularly concerned with the separation of uranium from plutonium and neptunium.

Most commercial reprocessing plants use the Purex process, in which the spent fuel is dissolved in nitric acid and the dissolved uranium and plutonium are subsequently extracted from the nitric acid solution into an organic phase of tributyl phosphate (TBP) dissolved in an inert hydrocarbon such as odourless kerosene. The organic phase is then subjected to solvent extraction techniques to partition the uranium from the plutonium.

More particularly, the organic phase is subjected to separation of fission products by solvent extraction and in some cases then to removal of technetium, before the so-called U/Pu split. In the U/Pu split, Pu(IV) is reduced to Pu(III) which is inextractable into the organic phase and therefore follows the aqueous stream while the U remains in the organic stream. Usually, the reducing agent used in the U/Pu split is U(IV). Np(VI) in the solvent stream is also reduced by the U(IV) to Np(IV). Np(IV) is extractable into the solvent and so exits the contactor in the solvent steam with the U product. Hydrazine nitrate is normally used to stabilise the U(IV) and Pu(III) against oxidation by, in particular, $HNO_2$. The unit for carrying out the partitioning of the U and Pu in practice comprises a contactor having a multiplicity of stages, for example six stages might be used in a modern centrifugal contactor.

There are disadvantages with such a process:

hydrazine is catalytically decomposed by Tc(VII) ions under certain conditions hydrazine can form undesirable oxidation products (e.g. ammonium salts)

U(IV) must be produced in a separate process on plant, thus increasing costs two reagents are needed Np is not separated from U so additional downstream processes are needed to remove Np from U.

It is also a disadvantage of current commercial Purex processes that they use a three cycle flowsheet [(1) the so-called HA cycle in which fission products are separated and the U/Pu split is performed; (2) the UP cycle in which the uranium stream is purified; (3) the PP cycle in which the plutonium stream is purified]. It is therefore desired to develop an Advanced Purex process in which there is a single solvent extraction cycle.

Moreover, neptunium valency control can be a significant problem in Purex reprocessing. Neptunium is present in the Purex process as a mixture of three different valence states: Np(IV), (V) and (VI). Np(IV) and (VI) are both extractable into the solvent phase whereas Np(V) is in-extractable into this phase. In order to direct Np to raffinate streams, Np is normally stabilised in the (V) oxidation state. This is a complex matter, since not only is it the middle oxidation state of three but Np(V) also undergoes competing reactions, such as disproportionation to Np(IV) and (VI) and is oxidised to Np(VI) by nitric acid. Neptunium control is therefore difficult and efficient neptunium control is a major aim of an advanced reprocessing programme. In commercial Purex reprocessing plants, Np is typically separated from uranium during the uranium purification (UP) cycle. Np(IV) is converted to Np(V) and Np(VI) by heating in the aqueous phase in a conditioner at a high temperature. The conditioned liquor is fed to an extract and scrub mixer-settler where the Np(V) is rejected to the aqueous raffinate. Any Np(VI) present in the aqueous feed is reduced to Np(V) by hydroxylamine which is fed to the scrub section of the contactor. In a typical process, two or three mixer-settlers are required to decontaminate the uranium product from Np.

Numerous studies have been conducted to find replacements for the U(IV)+hydrazine system with an efficient reductant for Pu(IV) and Np(VI). Amongst the reductants studied have been butyraldehydes, hydroquinones, substituted hydroquinones and substituted hydroxylamines, such as N-methylhydroxylamine and N,N-diethylhydroxylamine (Yu-Keung Sze, Gosselin Y. A, *Nucl. Technology,* 1983, vol 63, No. 3, pp 431–441; Koltonov V. S, Baranov S. M., *Radiokhimiya,* 1993, vol 35, No. 6, pp 11–21; Koltunov V., Baranov S., International Conference on Evaluation of Emerging Nuclear Fuel Cycle Systems (Global-95), September 1995, Versailles, France, Proceedings, vol. 1, pp 577–584).

A disadvantage of such known Np and Pu reduction processes is that their kinetics are potentially too slow for the short residence times of centrifugal or other intensified contactors which would be used in a modern Purex reprocessing plant. In particular, it is difficult to find reducing agents that rapidly reduce Pu(IV) and this is even more difficult if centrifugal contactors are to be used.

It has now been found that the incorporation of an OH (hydroxyl) group into organic derivatives of hydroxylamine will surprisingly increase the rate of Np(VI) and Pu(IV) reduction.

The present invention provides a spent fuel reprocessing method in which an organic phase containing Np(VI) is contacted with a hydrophilic substituted hydroxylamine in which at least one N—H hydrogen of the hydroxylamine is replaced by an organic substituent and there is at least one such organic substituent having one or more hydroxyl groups. The organic substituents are preferably alkyl groups or, in the case of hydroxyl-containing substituents, hydroxyalkyl and especially mono-hydroxyalkyl. Suitable alkyl groups include those having up to 4 carbon atoms but methyl and more particularly ethyl are preferred. The most preferred substituted hydroxylamine is ethyl(hydroxyethyl) hydroxylamine (EHEH) which has the formula $HOC_2H_4(C_2H_5)NOH$. The substituted hydroxylamine reduces Np(VI) to Np(V), which may then be backwashed into an aqueous phase.

Preferred reductants are hydroxyalkyl hydroxylamines of the formula

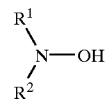

wherein $R^1$ is H or $C_1$–$C_4$ alkyl, and $R^2$ is $C_1$–$C_4$ hydroxyalkyl.

The organic phase preferably contains U(VI) and Pu(IV) as well as Np(VI), in which case the EHEH reduces the Pu(IV) to inextractable Pu(III), which may be backwashed into the aqueous phase together with the Np(V). At least in preferred processes using intensified contactors such as centrifugal contactors which have very short residence times, especially those using EHEH, no reduction of Np(V) to Np(IV) occurs so no downstream purification of the U product stream is necessary. It is a significant advantage of, in particular EHEH that the rate of Np(V) to Np(IV) reduction is low compared with the rate obtained using other reducing agents such as U(IV), $C_6H_5NHNH_2$ and ascorbic acid. We have found that when $[HNO_3]=2.0M$, [reductant]= 0.2M and T=45° C. that pseudo first order rate constants for Np(V) reduction are:

| | |
|---|---|
| U (IV) | $k_1 = 0.38$ min$^{-1}$ |
| $C_6H_5NHNH_2$ | $k_1 \cong 0.027$ min$^{-1}$ |
| Ascorbic acid | $k_1 = 0.071$ min$^{-1}$ |
| EHEH | $k_1 = 0.0024$ min$^{-1}$ |

If downstream purification of the U product stream should be necessary or desirable, the treated solvent (organic) phase may then be contacted with a hydrophilic complexant-reductant (preferably formohydroxamic acid) to complex with any Np(IV) and reduce any Np(VI), which is back-washed into a second aqueous phase (WO 97/30456 and The applications of formo- and aceto-hydroxamic acids in nuclear fuel reprocessing, R. J. Taylor, I. May, A. L. Wallwork, I. S. Denniss, N. J. Hill, B. Ya Galkin, B. Ya Zilberman and Yu. S. Fedorov, J. Alloys & Cpds., forthcoming).

In a preferred class of methods, the organic phase is contacted with the EHEH or other substituted hydroxylamine and the Pu(III) plus Np(V) are backwashed in a first contactor unit into the aqueous phase. U as U(VI) remains in the organic phase and may then be backwashed into dilute nitric acid in a subsequent contactor in the usual manner. The contactors are suitably multi-stage contactors.

The invention includes a method of reducing a species selected from Np(VI) and Pu(IV) to, respectively, Np(V) and Pu(III), which method comprises contacting the species with a substituted hydroxylamine as defined above. Of course, Np(VI) and Pu(IV) may be co-reduced by contacting the two species in combination with such a substituted hydroxylamine.

In the following description, EHEH is referred to as the reductant but it will be understood that alternative reductants as defined above may be used.

The present invention is further described by way of example only with reference to the accompanying drawings, in which:

FIG. 1 is a schematic flowsheet of a Purex reprocessing process incorporating a method of the invention.

FIG. 1 is therefore a flowsheet of a Purex reprocessing plant for performing a reprocessing method of the invention. In the method, EHEH is used to co-reduce Np(VI) and Pu(IV) in the U/Pu split operation and the resultant Np(V) is directed with the Pu product (Pu(III)). The following symbols are used in the Figure:

Broken arrows=Solvent streams

Solid arrows=Aqueous streams

In preferred embodiments of the invention, therefore, nitric acid solution resulting from dissolution of the spent fuel (HA feed in FIG. 1) is subject to removal of fission products and possibly Tc, for example in a conventional manner. A separate Tc rejection contactor may be added. The resulting organic stream containing U, Pu, Np and, in some cases, Tc, is sent to the U/Pu split operation. Conventionally, U is present as U(VI), Pu as Pu(IV) and Np as Np(VI). In the U/Pu split, Np(VI) and Pu(IV) are co-reduced to inextractable forms, Pu(III) and Np(V), by EHEH. The EHEH also reacts with $HNO_2$, so no additional scavenging agent such as hydrazine is needed.

The aqueous stream containing Np and Pu may be sent to product finishing for conversion into a solid product, for example in a conventional manner.

Optionally, the treated solvent stream is fed to an Np/Pu polishing unit to backwash any remaining Np or Pu into an aqueous stream. The two Np, Pu-containing aqueous streams may be combined and fed to a uranium extraction unit to re-extract any uranium into a solvent stream, prior to conversion of the Np, Pu into a solid product. The Pu, Np product may either be disposed of or used in the manufacture of MOX fuel (MOX=Mixed Oxide (U+Pu)).

In a second embodiment in accordance with the present invention, Np is removed from the uranium product solvent stream in a reductive strip contactor using, in particular, EHEH as a reductant for Np(VI), after backwashing of the Pu from the solvent steam during a U/Pu split operation. This gives a relatively pure Np-237 stream which can be disposed of independently if desired.

In preferred embodiments, the method of the invention dispenses with the separation of Pu and Np, which is used in commercial reprocessing plants. Accordingly, the plant may be smaller and the solvent and aqueous flows are reduced resulting in both environmental and economic benefits. The method features excellent Np control (U, Np separation) in using, in preferred embodiments, only EHEH to reduce Np. Both Pu and Np may be efficiently separated from the U-loaded solvent stream.

A yet further benefit of preferred methods of the invention is that no U(IV) is used as a reductant. Therefore, no U(IV) is backwashed with the Pu, Np product, which is thus purer. The process gives an opportunity for the number of stages in the U/Pu split operation to be decreased. Moreover, no depleted U(IV) is added to the 235U to be recovered and the final U stream is therefore more suitable for a uranium enrichment process. Also no U(IV) needs to be produced in a separate process plant or purchased thus giving added economic benefits.

Conventional Purex processes may include, after fission product separation, a Tc separation operation. The reason for this is that the hydrazine nitrate customarily used to stabilise U(IV) and Pu(IV) takes part in autocatalytic reactions with Tc and this leads to additional undesirable consumption of hydrazine. In preferred methods of the present invention, no U(IV) is added. Moreover, EHEH which reacts with Tc only very slowly, acts as a nitrous acid scavenger and so reduces Pu(III) re-oxidation. Accordingly, hydrazine may be dispensed with and, if a low Tc specification is acceptable for the Pu, Np product and U product, the Tc removal step may also be dispensed with.

It will be appreciated that the above-described process exemplifies a Purex reprocessing method, in which the active solvent feed entering the U/Pu split operation is treated with EHEH or another hydroxylated hydroxylamine derivative to reduce Pu(IV) to Pu(III) and Np(VI) to Np(V). Those reduced species are backwashed into an aqueous stream and the treated solvent stream is fed to a U backwash.

The invention thus enables the production of a Pu,Np product from nuclear reprocessing. This is beneficial because Np is a "burnable" neutron poison and if Pu is reused as a fuel it does not matter if Np is present. Furthermore it is an advantage to produce impure Pu products in that it prevents proliferation of nuclear weapons. Finally, it is better to remove Np with Pu than with U because U is not very radioactive and Np would be a significant $\alpha$-active containing product.

Uranium and/or plutonium recovered using a method of the invention may be formed into fissile material suitable for use in power generation, for example a fuel pellet. Exemplary fissile material is MOX fuel.

EXAMPLE 1

The first and second order rate constants were determined for the reaction of EHEH with Np(VI) and Pu(IV), respectively. The time of reaction completion was also determined. The results are shown in Tables 1 and 2 below:

Table 1—Rate Constants and Time of Reaction Completion with Np(VI)

The results were determined at [EHEH]=0.1 M, [Np(VI)]=1.2×10$^{-4}$ M and [HNO$_3$]=1.0 M. Standard techniques were used.

| T, °C. | k', min$^{-1}$ | τ$_{99}$, min |
|---|---|---|
| 20.0 | 24.2 | 0.19 |
| 35.0 | 56.1 | 0.08 | k' = first order rate constant.
τ$_{99}$ = time taken for ~99% reduction.

Since 4 moles of NpO$_2^{2+}$ are reduced by 1 mole of EHEH it is likely that reaction proceeds according to:

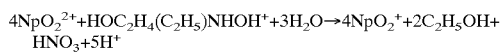
4NpO$_2^{2+}$+HOC$_2$H$_4$(C$_2$H$_5$)NHOH$^+$+3H$_2$O→4NpO$_2^+$+2C$_2$H$_5$OH+ HNO$_3$+5H$^+$ The rate of reaction is described by $$\frac{-d[\text{Np(VI)}]}{dt} = \frac{k[\text{Np(VI)}][\text{EHEH}]}{[\text{H}^+]^{O.M}}$$

where k=334±12M$^{-0.2}$ min$^{-1}$ at 25.6° C.
and E$_{ACT}$=42.3±2.7 kJ/mol.

Table 2—Rate Constants and Time of Reaction Completion with Pu(IV)

The results were determined at [EHEH]=0.1 M, [Pu(IV)]=0.01 M and [HNO$_3$]=1.0 M. Standard techniques were used.

| T, °C. | k", M$^{-1}$ s$^{-1}$ | τ$_{99}$, s |
|---|---|---|
| 20.0 | 12100 | 0.82 |
| 35.0 | 152000 | 0.065 | k" = second order rate constant.
τ$_{99}$ = time taken for ~99% reduction.

Since 6 moles of Pu(III) are produced per 1 mole of reductant consumed, it is likely that Pu(IV) is reduced according to:

6Pu$^{4+}$+HOC$_2$H$_4$(C$_2$H$_5$)NHOH$^+$+3H$_2$O→6Pu$^{3+}$+C$_2$H$_5$OH+ CH$_3$CHO+HNO$_3$+7H$^+$ At variable HNO$_3$ concentration the kinetics are described by:

$$\frac{-d[\text{Pu(IV)}]}{dt} = \frac{k[\text{Pu(VI)}]^2[\text{EHEH}]^{1.4}}{[\text{HNO}_3]^{3.7}}$$

where k=58700±10300 mol$^{13}$ l$^{-1}$·3 at 11° C.
E$_{ACT}$=127.2±8.9 KJ/mol

It can be seen that one advantage of EHEH compared to NH$_2$OH and unsubstituted hydroxylamines is that the reaction rate is not inhibited by the product Pu(III) ions.

Another advantage is that the stoichiometric ratios of Np(VI) and Pu(IV) to the reductant EHEH are high (i.e. 4:1 and 6:1 respectively). Therefore there will be a lower consumption of this reductant in the process, which gives economic benefits.

The above results indicate that EHEH has fast kinetics and is capable of use in intensified contactors (e.g. centrifugal contactors), which have a low residence tine (e.g. 20 s per stage).

EXAMPLE 2

Standard methods were used to determine the time needed for Np(VI) and Pu(IV) reduction reactions to reach 99% completion at [HNO$_3$]=1M; [reductant]=0.1M; [Pu(IV)]= 0.01 M, T=35° C. The results are shown in Table 3.

TABLE 3

| reductant | name | τ$_{99}$ Np (VI) (min) | τ$_{99}$ Pu (IV) (min) |
|---|---|---|---|
| NH$_2$OH | hydroxylamine | 0.055 | 240 |
| CH$_3$NHOH | methyl hydroxylamine | 0.29 | 2.0 |
| (CH$_3$)$_2$NOH | dimethyl hydroxylamine | 0.08 | 0.1 |
| (C$_2$H$_5$)$_2$NOH | diethyl hydroxylamine | 0.63 | 0.02 |
| HOC$_2$H$_4$(C$_2$H$_5$)NOH | ethylhydroxyethyl hydroxylamine | 0.08 | 0.001 |

What is claimed is:

1. A spent fuel reprocessing method in which an organic phase containing Np(VI) is contacted with a hydrophilic substituted hydroxylamine in which at least one N—H hydrogen of the hydroxylamine is replaced by an organic substituent and there is at least one such organic substituent having one or more hydroxyl groups, to reduce Np(VI) to Np(V), the Np(V) then being backwashed into an aqueous phase.

2. A method of claim 1 wherein the substituted hydroxylamine is of the formula:

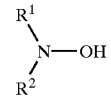

wherein
R$^1$ is H or C$_1$–C$_4$ alkyl, and
R$^2$ C$_1$–C$_4$ hydroxyalkyl.

3. A method of claim 2 wherein the substituted hydroxylamine is ethyl(hydroxyethyl)hydroxylamine.

4. A method of claim 1 in which the organic phase contains U, Pu and Np, the substituted hydroxylamine reducing Pu to Pu(III) as well as Np(VI) to Np(V), and the Pu(III) as well as the Np(V) being backwashed into the aqueous phase.

5. A method of claim 4, further comprising backwashing plutonium from the organic phase and wherein the reduction using the substituted hydroxylamine is performed after said backwashing of plutonium from the organic phase.

6. A Purex reprocessing method comprising treating an active solvent feed entering a U/Pu split operation with a hydrophilic substituted hydroxylamine in which at least one N—H hydrogen of the hydroxylamine is replaced by an organic substituent and there is at least one such organic substituent having one or more hydroxyl groups, to reduce Pu to Pu(III) and Np(VI) to Np(V), wherein the Pu(III) and Np(V) species are backwashed into an aqueous stream.

7. A method of reducing Np(VI) to Np(V), said method comprising contacting Np(VI) with a hydrophilic substituted hydroxylamine in which at least one N—H hydrogen of the hydroxylamine is replaced by an organic substituent and wherein there is at least one such organic substituent having one or more hydroxyl groups.

8. A method of reducing Pu(IV) to Pu(III), said method comprising contacting Pu(IV) with a hydrophilic substituted hydroxylamine in which at least one N—H hydrogen of the hydroxylamine is replaced by an organic substituent and wherein there is at least one such organic substituent having one or more hydroxyl groups.

9. A method according to claim 7 wherein the substituted hydroxylamine is of the formula:

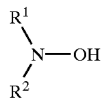

wherein $R^1$ is H or $C_1$–$C_4$ alkyl, and $R^2$ is $C_1$–$C_4$ hydroxyalkyl.

10. A method of reducing Np(V) to Np(IV), said method comprising contacting Np(V) with a hydrophilic substituted hydroxylamine in which at least one N—H hydrogen of the hydroxylamine is replaced by an organic substituent and there is at least one such organic substituent having one or more hydroxyl groups.

* * * * *